United States Patent [19]

Ikari et al.

[11] 4,205,646
[45] Jun. 3, 1980

[54] HEAT CONTROL VALVE

[75] Inventors: Jiro Ikari; Toshinari Onishi, both of Toyota, Japan

[73] Assignee: Toyota Jidosha Kogyo Kabushiki Kaisha, Toyota, Japan

[21] Appl. No.: 972,037

[22] Filed: Dec. 21, 1978

[30] Foreign Application Priority Data

May 31, 1978 [JP] Japan .............................. 53/74950[U]

[51] Int. Cl.² ............................................ F02M 31/00
[52] U.S. Cl. .............................. 123/122 AC; 251/305; 251/306; 123/122 AB; 123/122 H
[58] Field of Search ..... 123/122 AC, 122 H, 122 AB; 251/305, 306, 11; 137/468; 165/40; 236/101 D, 101 C

[56] References Cited

U.S. PATENT DOCUMENTS

| 3,070,347 | 12/1962 | Ball | 137/468 |
| 3,853,104 | 12/1974 | Namby | 123/122 AC |
| 3,941,106 | 3/1976 | Kobayashi | 123/122 AC |
| 3,970,062 | 7/1976 | Nakada | 123/122 AC |

Primary Examiner—Ronald H. Lazarus

Attorney, Agent, or Firm—Oblon, Fisher, Spivak, McClelland & Maier

[57] ABSTRACT

A seal construction for a heat control valve in a system for heating a fuel-air mixture in the intake manifold of an internal combustion engine by transfer of heat from exhaust gas flowing through a heating chamber defined in a portion of an exhaust manifold. The heating chamber is defined by a top wall, a bottom wall and two pairs of opposite sidewalls and the top wall is situated between the intake and exhaust manifolds. The heat control valve is made of a flat plate and fixed to a valve shaft rotatably supported by a pair of sidewalls across the heating chamber to swing therein. The side edges and the bottom edge of the heat control valve is brought into overlapping contact with the shoulders around concavities formed on the pair of sidewalls and the bottom wall of the heating chamber to stop swinging of the heat control valve over its fully closed position. Therefore, exhaust gas is sealed at the shoulders when the heat control valve is fully closed and flows only along the top wall of the exhaust manifold to effectively heat the fuel-air mixture in the intake manifold.

5 Claims, 3 Drawing Figures

HEAT CONTROL VALVE

BACKGROUND OF THE INVENTION

1. Field of the Invention

In an internal combustion engine provided with a heat control valve in an exhaust manifold, the present invention relates to a seal construction to prevent leakage of exhaust gas through a gap between the heat control valve and the inner surface of the exhaust manifold when the fuel-air mixture in the intake manifold is to be heated.

2. Description of the Prior Art

Generally, in an internal combustion engine, it is known that it is advantageous for the acceleration of vaporization of the gasoline and the combustion of the fuel-air mixture in the cylinders of the engine to heat the fuel-air mixture to some extent before it is supplied to the cylinders. The fuel-air mixture may be heated by hot water from an engine cooling system, but such method requires much time for the fuel-air mixture to reach an appropriate temperature, so that the fuel-air mixture is usually heated by the exhaust gas.

For heating the fuel-air mixture using exhaust gas, a heating chamber is conventionally provided in a portion of the exhaust manifold which is divided from the intake manifold by the top wall of the exhaust manifold, a heat control valve is provided in the heating chamber, and the exhaust gas is contacted with the top wall due to the rotation or swinging of the heat control valve to heat the fuel-air mixture in the intake manifold, or the exhaust gas is prevented from contacting the top wall when heating of the fuel-air mixture is not required.

In such conventional prior art heat control mechanisms, when the heat control valve is rotated or swung to heat the fuel-air mixture, an arm attached to a rotational shaft of the heat control valve is adapted to abut a stopper provided outside of the heating chamber, or, alternatively, the heat control valve is adapted to abut a projection provided within the heating chamber to stop the heat control valve from rotating over the fully closed position thereof.

In a conventional heat control mechanism, however, a space is formed between the heat control valve and the inner surface of the heating chamber for smooth rotation of the heat control valve. Accordingly, even when the heat control valve is fully closed, a part of the exhaust gas flows through the space between the heat control valve and the inner surface of the heating chamber, therefore, it takes much time for the fuel-air mixture to reach an appropriate temperature and fuel consumption is wastefully increased. Further, if a vehicle is operated with an engine in which heating of the fuel-air mixture is not fully completed, the travelling stability of the vehicle is damaged. Moreover, the projecting stopper in the heating chamber above described obstructs smooth flowing of the exhaust gas and causes loss of engine power.

SUMMARY OF THE INVENTION

It is an object of this invention to provide a seal construction for a heat control valve comprising a valve member formed from a plate, which may seal and prevent the exhaust gas from leaking along the side edges and the bottom edge of the heat control valve member when the heat control valve is fully closed.

It is another object of this invention to provide a seal construction for a heat control valve, wherein the warming-up period of the engine is shortened and fuel consumption in the warming-up process is reduced.

It is further another object of this invention to provide a seal construction for a heat control valve, wherein the volume of the exhaust manifold downstream of the heat control member is increased and loss of engine power is prevented.

BRIEF DESCRIPTION OF THE DRAWINGS

The invention will now be described in further detail by way of example with reference to the accompanying drawings, in which.

DETAILED DESCRIPTION OF THE PREFERRED EMBODIMENTS

Figure 2:
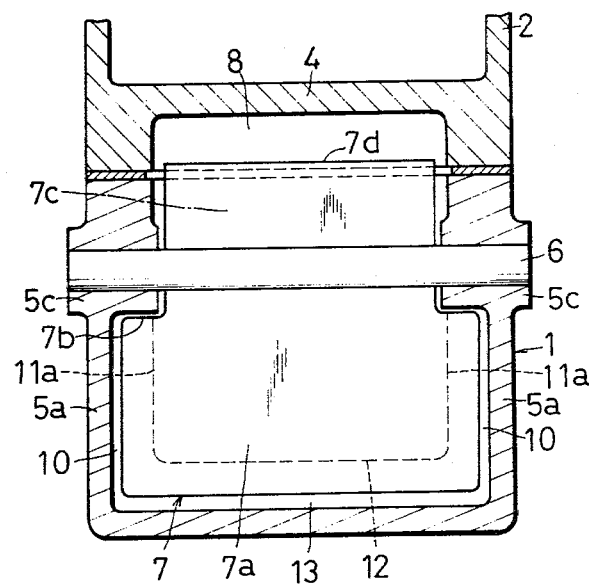
FIG. 2 is a cross sectional view of the embodiment of FIG. 1 taken on line II—II thereof.
Figure 3:
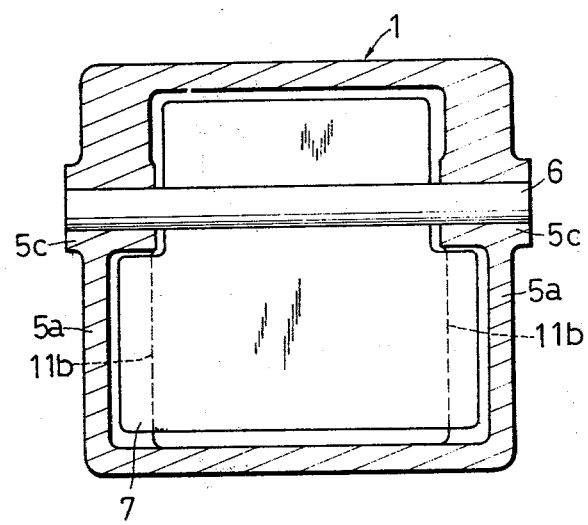
FIG. 3 is a cross sectional view of the embodiment of FIG. 1 taken on line III—III thereof.

According to this invention, in an internal combustion engine an exhaust manifold 1 is connected with an intake manifold 2 through a gasket 3 and a top wall 4 is formed between the exhaust manifold 1 and the intake manifold 2. The exhaust manifold 1 includes a heating chamber 5, a part thereof being defined by the top wall 4. A horizontal valve shaft 6 is rotatably supported by boss portions 5c formed on opposite sidewalls 5a of the heating chamber 5 a little above the middle of the cross section of the heating chamber 5 in FIG. 2. A heat control valve member 7 formed from a generally rectangular plate comprises a wider and lower rectangular portion 7a, shoulder portions 7b and a narrower, upper rectangular portion 7c. The heat control valve member 7 is secured to the valve shaft 6 at the narrower and upper rectangular portion 7c in such a manner as to form a little space between the inferior surface of the boss portion 5c on each sidewall 5a and the shoulder portion 7b of the heat control valve member 7. The opposite sidewalls 5a of the heating chamber 5 are formed in their interior surfaces with a symmetrical pair of sectorial concavities 10. Each of the sectional concavities 10 has a pair of inclined side edges extending radially relative to the shaft 6, and an arcuate bottom edge having a center of curvature on the axis of the shaft 6.

Figure 1:
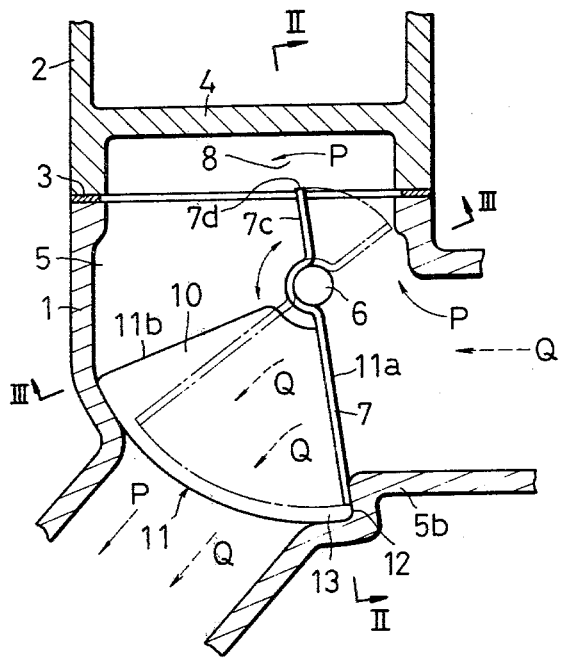
FIG. 1 is a front sectional view of an embodiment of this invention.

The radially extending edges of each sectorial concavity 10 define a pair of inclined shoulders 11a and 11b each lying in an inclined plane which is perpendicular to both the plane in which the internal surface of the sidewall is located and that in which the bottom surface of the concavity 10 lies. The arcuate bottom edge of the concavity 10 defines an arcuately curved shoulder 11 which is perpendicular to the bottom surface of the concavity 10. The bottom wall 5b of the heating chamber 5 is recessed at 13 defining a horizontally extending, inclined shoulder 12. The shoulder 12 is contiguous to one of the inclined shoulders indicated at 11a and lies in the plane of the shoulder 11a as shown in FIG. 1. The recess 13 of the bottom wall 5b has a bottom surface which is contiguous to the arcuately curved shoulder 11.

The wider and lower rectangular portion 7a of the heat control valve member 7 is movably fitted in the concavities 10 and the narrower and upper rectangular portion 7c of the heat control valve 7 is movably fitted between the sidewalls 5a, therefore, the heat control valve member 7 freely rotates or oscillates about the valve shaft 6 and is urged to abut on the radially extending shoulder 11a on one extremity of each of the sectorial concavity 10 and the horizontally extending, inclined shoulder 12 in the bottom wall 5b or the other radially extending shoulder 11b on the other extremity of each sectorial concavity 10. When the heat control valve member 7 rotates counterclockwise in FIG. 1 and abuts on the shoulders 11a and 12, the heat control member 7 is fully closed. In this case, the exhaust gas flows through a gap 8 between the upper edge 7d of the heat control valve member 7 and the top wall 4 as shown by arrows P to heat the fuel-air mixture in the intake manifold 2. Under these circumstances, the heat control valve member 7 is brought into overlapping contact with the shoulders 11a and 12 to effectively seal the exhaust gas.

When the heat control valve member 7 rotates clockwise and abuts the other radially extending shoulder 11b of each concavity 10, the heat control valve member 7 is fully opened and the exhaust gas flows following arrows Q in FIG. 1 to scarcely heat the air-fuel mixture in the intake manifold 2. In this case, too, the heat control valve member 7 is brought into overlapping contact with the shoulder 11b to seal the exhaust gas.

According to this invention, when the heat control valve member 7 is fully closed, the side edges and the bottom edge of the heat control valve member 7 are sealably and overlappingly contacted with the shoulders 11a and 12 of the concavities 10, so that the whole amount of the exhaust gas passes through the gap 8 between the top wall 4 and the upper edge 7d of the heat control valve member 7. Accordingly, the fuel-air mixture flowing through the intake manifold 2 at the time of starting of the engine is rapidly heated and the fuel consumption for warming up of the engine is reduced. When the heat control valve member 7 is fully opened, the exhaust gas flows into the behind of the heat control valve member 7 but as the side edges of the heat control valve member 7 are sealably and overlappingly contacted with the radially extending shoulders 11b of the concavities 10 to prevent the exhaust gas from entering the upper portion of the heating chamber 5, the fuel-air mixture in the intake manifold 2 is scarcely heated. Further, there is no projection in the inferior portion of the heating chamber 5 to prevent the exhaust gas from smoothly flowing therethrough when the heat control valve member 7 is fully opened and the volume of the exhaust manifold 1 is increased downstream of the shoulders 11a and 12, therefore, loss of the engine power is effectively prevented.

Obviously, many modifications and variations of the present invention are possible in light of the above teachings. It is therefore to be understood that within the scope of the appended claims the invention may be practiced otherwise than as specifically described herein.

What is claimed is:

1. A heat control valve in a system for heating a fuel-air mixture in the intake manifold of an internal combustion engine, said intake manifold being partitioned off an exhaust manifold by a top wall of said exhaust manifold, said exhaust manifold being surrounded by said top wall, a bottom wall and first and second pairs of opposite sidewalls, said valve comprising a valve member formed from a generally rectangular plate having peripheral edges and a shaft spanning said first pair of sidewalls, said valve member being rotatably fixed on said shaft to swing in said exhaust manifold for opening and closing said exhaust manifold, said second pair of sidewalls including shoulders and said bottom wall including a shoulder defining first and second concavities on the interior surface of each of said second pair of sidewalls for overlappingly contacting said peripheral edges of said heat control valve member to prevent said valve member from swinging beyond its fully closed position whereby exhaust gases flowing through the exhaust manifold are deflected around an end portion of the valve member in close proximity to the top wall to transmit heat thereto.

2. The heat control valve as set forth in claim 1, wherein said first and second concavities each comprise a downwardly spread sectorial configuration having an arcuate bottom edge having its center of curvature on the axis of said shaft, said concavities of sectorial configuration being opposite to each other and of equal shape and dimensions, each of said concavities of sectorial configuration having a pair of side edges extending radially with respect to said shaft, wherein said shoulders defining said concavities of sectorial configuration are perpendicular to said interior surfaces of said sidewalls, and wherein said shoulder defining said concavity on said bottom wall lies in a plane common to that in which said side edge of each sectorial concavity lies, and is contiguous to said shoulder defined by said one side edge of each sectorial concavity so as to form a U-shaped planar surface of sealing contact with said valve member which is capable of swinging within a space surrounded by said sectorial concavities.

3. The heat control valve as set forth in claim 1, wherein said heat control valve member comprises an upper and narrower half rectangular portion by which said valve member is supported on said shaft for rotation thereabout and a lower and wider half rectangular portion.

4. The heat control valve as set forth in claim 2, wherein said heat control valve member is eccentrically fixed on said shaft and the sectorial concavities accommodate at least a portion having a larger area of the two half portions of the valve member divided by said shaft.

5. A heat control valve in a system for heating a fuel-air mixture in the intake manifold of an internal combustion engine by transfer of heat from exhaust gas flowing through a heating chamber defined in a portion of an exhaust manifold when said valve is in its closed position to substantially close passage through said exhaust manifold and bypass exhaust gas through said heating chamber, while in its open position said valve keeps said passage through said exhaust manifold open and shuts off said bypassing, said heating chamber being defined by a top wall, a bottom wall and first and second pairs of opposite sidewalls, said top wall being situated between said intake and exhaust manifolds and said transfer of heat being effected through said top wall, said bottom wall having an opening establishing fluid communication between said engine and said exhaust manifold, said first pair of sidewalls having an opening defining said passage through said exhaust manifold in conjunction with said opening of said bottom wall, said valve comprising a valve member formed from a generally rectangular plate and a shaft spanning said first pair of sidewalls, said valve member having an upper half portion by which said valve member is supported on said shaft for rotation thereabout, and a lower half portion, said second pair of sidewalls defining first and second sectorial concavities spaced below said shaft and having a pair of opposite edges radially extending from said shaft and an arcuate bottom edge bordering an edge of said opening of said bottom wall, said arcuate bottom edge being greater in length than than said edge of said bottom wall opening, said radially extending edges of said sectorial concavities defining a pair of radially extending shoulders located at opposite extremities between which said lower half portion of said valve member is movable about said shaft, one of said shoulders of said sectorial concavities being disposed adjacent said sidewall opening, said sectorial concavities being horizontally aligned with each other;

said bottom wall being recessed at an edge of said sidewall opening and defining a horizontally extending shoulder which is contiguous to, and coplanar with, said one shoulder of each of said sectorial concavities; and said lower half portion of said valve member being enlarged relative to said upper half portion and having a pair of side edges received in said sectorial concavities and a bottom edge which is arcuately movable into said recess of said bottom wall, said side edges overlappingly contacting with said shoulders of said sectorial concavities, while said bottom edge of said lower half portion overlappingly contacts with said shoulder on said bottom wall when said valve is in its closed position.

* * * * *